(12) United States Patent
Puzon

(10) Patent No.: US 9,699,650 B2
(45) Date of Patent: Jul. 4, 2017

(54) SYSTEM FOR COMMUNICATING WITH A SINGLE MOBILE COMMUNICATIONS DEVICE HAVING MULTIPLE MS-ISDN IDENTIFIERS

(75) Inventor: John Joseph Gabriel C. Puzon, Paranaque (PH)

(73) Assignee: VOXP PTE LTD, Singapore (SG)

( * ) Notice: Subject to any disclaimer, the term of this patent is extended or adjusted under 35 U.S.C. 154(b) by 0 days.

(21) Appl. No.: 12/919,236

(22) PCT Filed: Apr. 27, 2009

(86) PCT No.: PCT/SG2009/000152
§ 371 (c)(1),
(2), (4) Date: Aug. 25, 2010

(87) PCT Pub. No.: WO2009/108139
PCT Pub. Date: Mar. 9, 2009

(65) Prior Publication Data
US 2011/0007750 A1     Jan. 13, 2011

(30) Foreign Application Priority Data
Feb. 26, 2008   (PH) .......................... 1-2008-000060

(51) Int. Cl.
*H04L 12/46* (2006.01)
*H04W 8/26* (2009.01)
(Continued)

(52) U.S. Cl.
CPC ................ *H04W 8/26* (2013.01); *H04W 8/04* (2013.01); *H04W 88/18* (2013.01)

(58) Field of Classification Search
CPC ......... H04W 8/26; H04W 8/04; H04W 88/18; H04W 8/28; H04W 76/021; H04W 76/022
(Continued)

(56) References Cited

U.S. PATENT DOCUMENTS 6,178,331 B1 * 1/2001 Holmes ............... H04M 3/5307
                                                                455/412.1
6,662,017 B2   12/2003 McCann et al.
(Continued)

*Primary Examiner* — Mark Rinehart
*Assistant Examiner* — Kenneth P Hunt
(74) *Attorney, Agent, or Firm* — JCIP; Joseph Chu

(57) ABSTRACT

A communication system (10) comprising a first communications device (12) operable by way of a first telecommunications network (16*a*); a second communications device (14) operable by way of the first telecommunications network (16*a*) and at least one additional telecommunications network (16*b*), each telecommunication network (16) issuing a unique MS-ISDN to the second communications device (14) to enable such operation; and a communications facilitator (20) associated with the first telecommunications network (16*a*) where, when a communication from the first communications device (12) to the second communications device (14) is received by the communications facilitator (20), the communications facilitator assesses at least one characteristic of the second communications device (14) and/or MS-ISDNs allocated to the second communications device (14) to identify a communication link and relays the communication to the second communications device (14) by way of the additional telecommunications network (16) that allocated the MS-ISDN identified as the communication link.

27 Claims, 2 Drawing Sheets

(51) Int. Cl.
*H04W 8/04* (2009.01)
*H04W 88/18* (2009.01)

(58) Field of Classification Search
USPC .............. 455/435.1, 404.2, 432.1, 403–466
See application file for complete search history.

(56) References Cited

U.S. PATENT DOCUMENTS

| | | | |
|---|---|---|---|
| 6,735,290 B1* | 5/2004 | Rauba | H04M 15/00 379/114.01 |
| 6,738,622 B1 | 5/2004 | Stadelmann et al. | |
| 6,956,831 B1* | 10/2005 | Mahr | H04L 12/5895 370/310 |
| 7,450,939 B2* | 11/2008 | Scheinert | H04L 12/66 370/328 |
| 2005/0070278 A1* | 3/2005 | Jiang | H04W 8/183 455/432.3 |
| 2005/0192035 A1 | 9/2005 | Jiang | |
| 2006/0040664 A1* | 2/2006 | Murray | H04M 3/44 455/435.1 |
| 2007/0213075 A1* | 9/2007 | Jiang | 455/461 |
| 2008/0139186 A1* | 6/2008 | Ringland | H04M 1/2745 455/415 |
| 2008/0287148 A1* | 11/2008 | Silver | H04L 12/5895 455/466 |
| 2009/0129371 A1* | 5/2009 | Bishay | H04W 84/042 370/352 |
| 2009/0215449 A1* | 8/2009 | Avner | H04W 8/06 455/433 |
| 2010/0312677 A1* | 12/2010 | Gardner | H04M 15/00 705/30 |
| 2012/0220319 A1* | 8/2012 | Makin | H04W 4/14 455/466 |
| 2014/0302825 A1* | 10/2014 | Mogalapalli | H04W 4/14 455/414.1 |
| 2016/0173419 A1* | 6/2016 | Mendiola | H04L 51/04 709/206 |
| 2016/0183178 A1* | 6/2016 | Marimuthu | H04W 4/023 455/432.1 |
| 2016/0337845 A1* | 11/2016 | Noldus | H04W 8/06 |

* cited by examiner

US 9,699,650 B2

SYSTEM FOR COMMUNICATING WITH A SINGLE MOBILE COMMUNICATIONS DEVICE HAVING MULTIPLE MS-ISDN IDENTIFIERS

FIELD OF THE INVENTION

The invention relates to a system for communicating with a single mobile communications device having multiple Mobile Subscriber Integrated Services Digital Network ("MS-ISDN") identifiers. The invention is particularly suited for use in situations where the parties seeking to communicate with the single mobile communications device are from developing countries or isolated areas where specialist telecommunications or internet infrastructure is not readily available.

BACKGROUND TO THE INVENTION

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

People are increasingly mobile. It is not uncommon these days for a person to travel through multiple countries in short periods of time. Where the change in geographical location is to an isolated area or developing country, communication with the traveller may be problematic.

To address the first issue mentioned above, it is common for people to either activate international roaming on their mobile phone or, if they are a regular visitor, to obtain a mobile phone more suited for communication in the geographical location concerned. However, international roaming is a costly solution for the traveller. While having multiple mobile phones may reduce call charge costs, it does introduce additional problems associated with multiple mobile phones (such as which phone is ringing, additional weight and space). It also means in most instances that the person trying to contact the traveller must know where they are in order to know which phone to call them on.

A further problem exists when a person relocates from a developing country or an isolated area to a new country—for example to seek a better living. In this situation, it is likely to be problematic for friends and family to be able to keep in touch with the person, but more so for economic reasons than technical reasons.

A past solution to this particular problem has been to ship a special phone to the relocated person. This special phone is provided under contract to the relocated person and the contractual payments are charged to the relocated person's credit card. While this system allows friends and family to keep in contact with the relocated person, it introduces two new problems in that: a) the ability to communicate is tied specifically to that special phone and cannot be assigned or otherwise transferred to a new phone; b) it is not possible to communicate with the special phone through messaging systems such as the short messaging system ("SMS").

In seeking to address both problems, travellers and relocated persons have turned to Voice over Internet Protocol systems. Some of these systems, such as Skype™ allow for message communication as well as voice communication. However, while VoIP systems have the flexibility to provide reasonably stable voice communication regardless of the location of the traveller/relocated person or the device they are using to communicate with—they are dependent on the ability for at least one communicating party to be able to access a broadband internet service. This may not be possible in isolated areas or developing countries where general computer penetration, let alone internet penetration, is low.

It is therefore an object of the present invention to provide a system for communicating with a single mobile communications device having multiple MS-ISDN identifiers in a manner that overcomes, or at least alleviates in part, both of the problems mentioned above.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

In accordance with a first aspect of the invention there is a communication system comprising:
  a first communications device operable by way of a first telecommunications network;
  a second communications device operable by way of the first telecommunications network and at least one additional telecommunications network, each telecommunication network issuing a unique MS-ISDN to the second communications device to enable such operation; and
  a communications facilitator associated with the first telecommunications network
where, when a communication from the first communications device to the second communications device is received by the communications facilitator, the communications facilitator assesses at least one characteristic of the second communications device and/or MS-ISDNs allocated to the second communications device to identify a communication link and relays the communication to the second communications device by way of the additional telecommunications network that allocated the MS-ISDN identified as the communication link.

The second communications device is preferably a mobile communications device. The communication may be a text message.

On receiving the communication from the first communications device, the communications facilitator may manage the communication so that it is treated as having terminated with the communications facilitator.

The unique MS-ISDN issued by the first telecommunications network to the second communications device may be taken from a designated pool of unique MS-ISDNs.

The at least one characteristic may be one or both of the following: the HLR of each MS-ISDN; the carrier of each MS-ISDN.

A confirmation communication may be made to the second communications device seeking confirmation that a communication from the first communications device can be relayed to the second communications device, before so relaying the communication.

The communication facilitator may receive the communication from the first communications device by way of a shortcode.

In accordance with a second aspect of the invention there is a method of communicating between a first communications device operable by way of a first telecommunications network and a second communications device operable by way of the first telecommunications network and at least one additional telecommunications network, each telecommunication network using a unique MS-ISDN to the second communications device to enable such operation, the method comprising the steps of:
receiving a communication from the first communications device;
assessing at least one characteristic of the second communications device and/or MS-ISDNs allocated to the second communications device to identify a communication link; and
relaying the communication to the second communications device by way of the additional telecommunications network that allocated the MS-ISDN identified as the communication link.

In accordance with a third aspect of the invention there is a communications facilitator for facilitating communication between a first communications device operable by way of a first telecommunications network and a second communications device operable by way of the first telecommunications network and at least one additional telecommunications network, each telecommunication network issuing a unique MS-ISDN to the second communications device, to enable such operation, the communications facilitator also associated with the first telecommunications network and operable, on receipt of a communication from the first communications device to assess at least one characteristic of the second communications device and/or MS-ISDNs allocated to the second communications device to identify a communication link and relay the communication to the second communications device by way of the additional telecommunications network that allocated MS-ISDN set as the communication link.

In accordance with a fourth aspect of the invention there is a second communications device operable by way of a first telecommunications network and at least one additional telecommunications network, each telecommunications network issuing a unique MS-ISDN to the second communications device to enable such operation, the second communications device to receive a communication from a communication facilitator, the communication initiated by a first communication device operable by way of the first telecommunications network, by way of a MS-ISDN determined based on an assessment by the communication facilitator of at least one characteristic of the second communications device and/or each MS-ISDN allocated to the second communications device.

In accordance with other aspects of the invention there is a communication generated in accordance with the method described above and an executable program recorded on a media able to be read by a processing system for performing the steps of the method as described above.

BRIEF DESCRIPTION OF THE DRAWINGS

The invention will now be described, by way of example only, with reference to the accompanying drawings, in which.

PREFERRED EMBODIMENTS OF THE INVENTION

Figure 1:
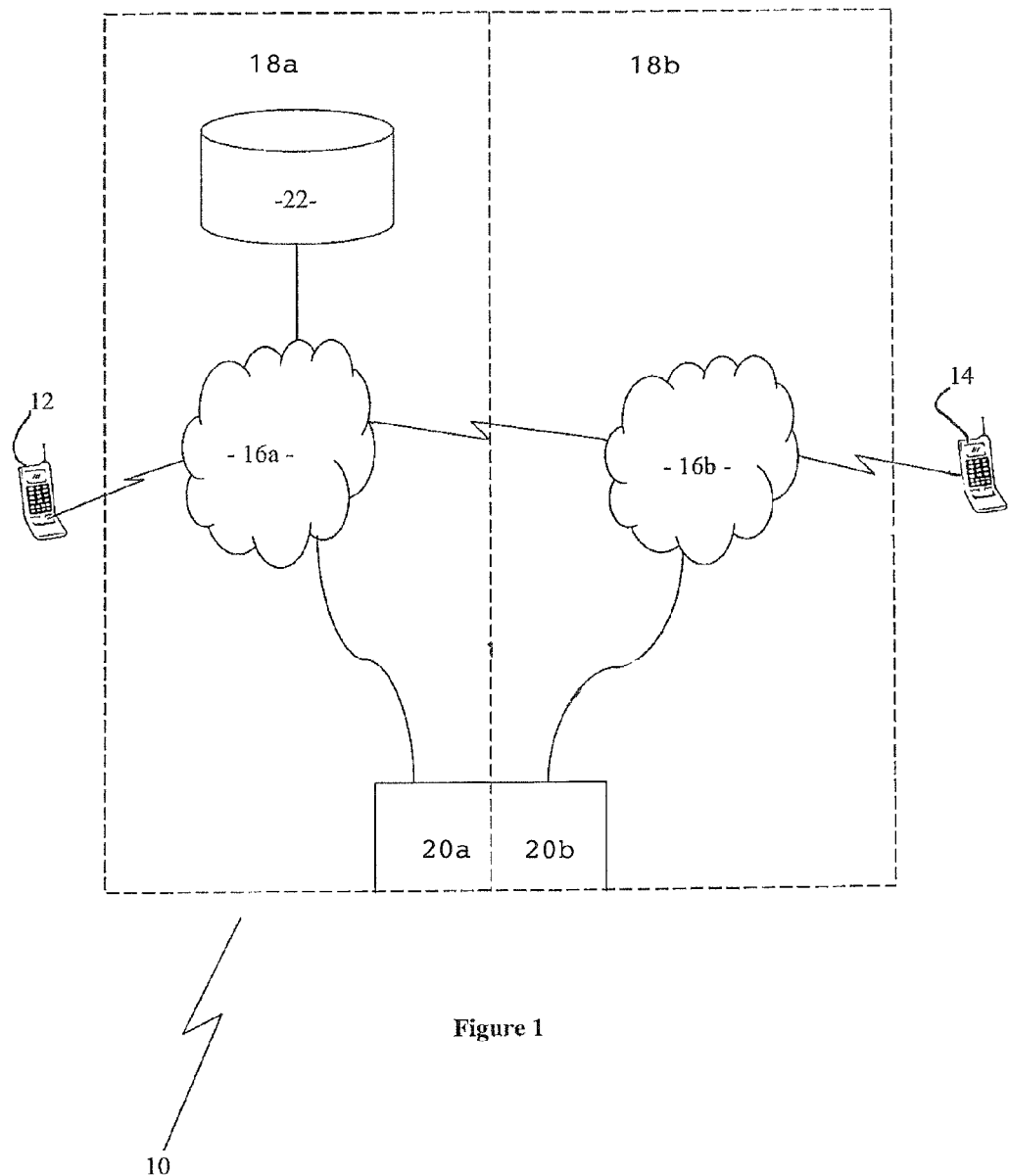
FIG. 1 is a schematic representation of a first embodiment of the present invention where the method of communication is a voice call and the call is made to the single mobile communications device.
Figure 2:
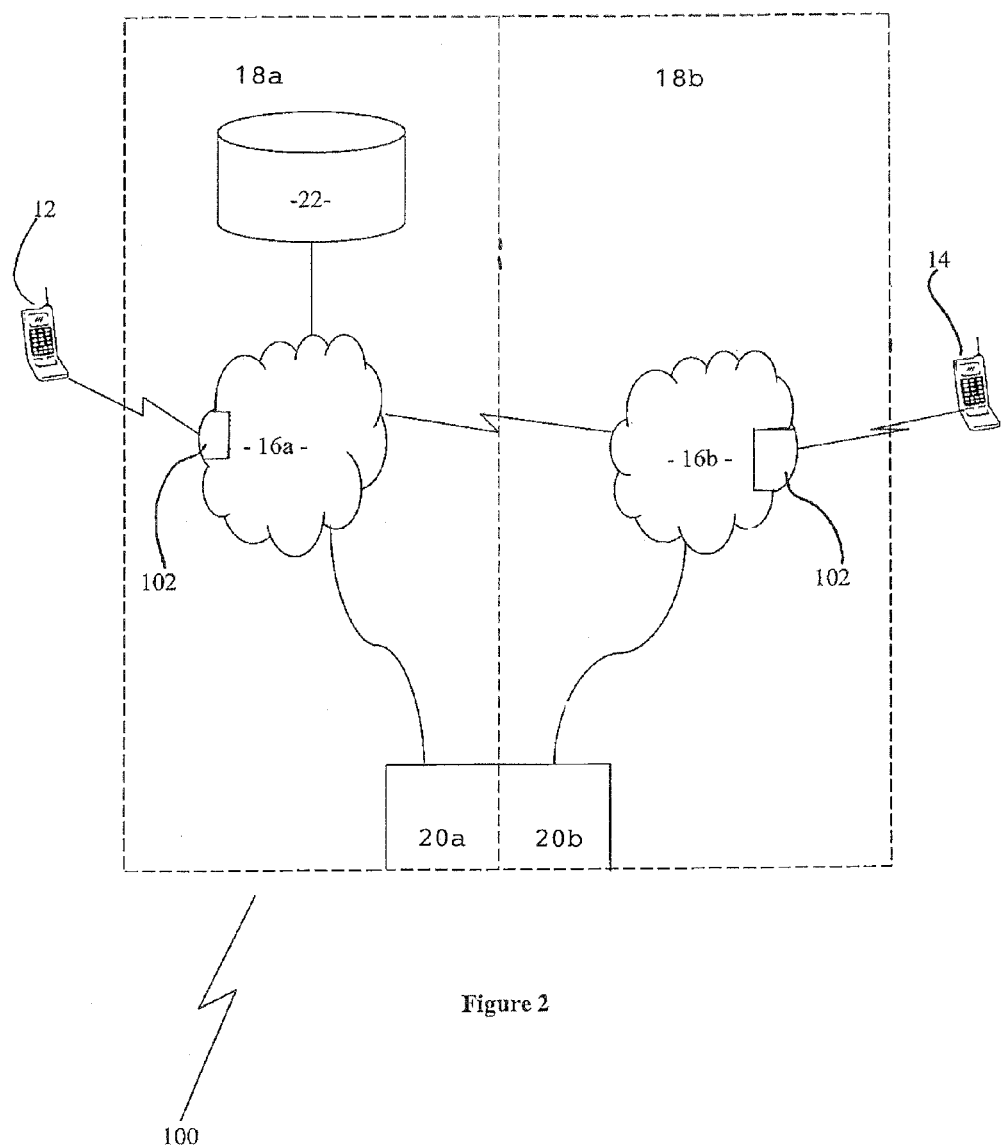
FIG. 2 is a schematic representation of a second embodiment of the present invention where the method of communication is a voice call and the call is made by the single mobile communications device.

Specific embodiments of the present invention are now described in detail. The terminology used herein is for the purpose of describing particular embodiments only, and is not intended to limit the scope of the present invention.

In accordance with a first embodiment of the present invention there is a system 10 for communicating with a single mobile communications device having multiple MS-ISDN identifiers.

The system 10 comprises a first communications device 12, a second communications device 14, a plurality of mobile phone networks 16, each mobile phone network 16 being operated by a telecommunications carrier 18a, 18b.

The first communications device 12 has a MS-ISDN identifier issued to it by the telecommunications carrier 18a of a first mobile phone network 16a. The first communications device 12 is further operable to communicate by voice and messaging systems with other communications devices by way of the first mobile phone network 16a.

The second communications device 14 has a MS-ISDN identifier issued to it by the telecommunications carrier 18b of the first mobile phone network 16a. The second communications device 14 has a further MS-ISDN identifier issued to it by each of the other mobile phone networks 16. The second communications device 14 is thereby able to communicate by voice and messaging systems with other communications devices by way of at least one of the mobile phone networks 16.

In this embodiment, the plurality of mobile phone networks 16 each cover a different geographical area. Each telecommunications carrier has an administration system indicated by reference numerals 20a and 20b to administer the general functions of the mobile phone network 16 and the present system 10.

The embodiment will now be described in the context of the following example of its use.

The telecommunications carrier 18a of the first mobile phone network 16a sets aside a pool of re-usable MS-ISDN identifiers. MS-ISDN identifiers in this pool are made available to second communications devices 14 on a rental basis. It is from this pool of MS-ISDN identifiers that the administration system 20a allocates a MS-ISDN identifier to the second communications device 14 for communication through the first mobile phone network 16a.

The telecommunications carriers of the remaining mobile phone networks (not shown) remain unrestricted in their allocation of an MS-ISDN identifier to the second communications device 14. In this manner, the second communications device 14 has a plurality of MS-ISDN identifiers, with each MS-ISDN identifier allocated by a different telecommunication carrier to facilitate voice and messaging system communication through their respective mobile phone network.

At the same time as the administration system 20b allocates a MS-ISDN identifier to the second communications device 14, the owner of the second communications device 14 is prompted to enter in details of the MS-ISDN identifiers allocated to it by the other mobile phone networks 16 as well as other commercial information to facilitate the rental of the allocated MS-ISDN identifier. A table is then established by the administration system 20 cross-referencing the allocated MS-ISDN identifier with the entered MS-ISDN identifiers. This table is then stored in an associated database 22.

With the cross-reference table established and stored in the associated database 22, the first communications device 12 is able to communicate with the second communications device 14 as follows.

The first communications device 12 is operated in a manner that indicates that a voice call is seeking to be established between the first communications device 12 and the second communications device 14. The method for initiating a voice call differs from communications device to communications device and will not be described in more detail here. However, to show that the voice call is intended for the second communications device 14, the allocated MS-ISDN identifier for the second communications device 14 is entered as the destination address for the voice call.

As the voice call is routed through the first mobile phone network 16*a*, the administration system 20 identifies the voice call as being one intended for a communications device having an MS-ISDN identifier included in the pool of MS-ISDN identifiers allocated for use by the system 10. With this information, the administration system 20*a* operates to determine the present location of the second communications device 14 by way of the home location register ("HLR") of each of the MS-ISDN identifiers associated with the second communications device 14 as stored in the appropriate table in the associated database 22. The MS-ISDN identifier having the matching HLR, and the mobile phone network 16 that allocated that MS-ISDN identifier (hereafter the "destination network" 16*b*), is then stored as the destination address for the voice call.

The administration system 20*a* thereafter operates in a manner that a further voice call is sought to be established between a communication line operable on the destination network 16*b* associated with the administration system 20*b* and the MS-ISDN identifier for the second communications device 14 for the destination network 16*b*.

If this further voice call is able to be established, the administration system 20*a* acts to terminate the voice call, for charging purposes, within the first mobile phone network 16*a*. It should be understood that this termination does not affect either voice call.

Subsequent conversation between the first communications device 12 and the second communications device 14 is then achieved by way of the voice call to the administration system 20*b* where it is converted to a VoIP call to the associated communication line operable on the destination network 16*b*. Final routing of the voice call is achieved by converting the voice call back to its original form for communication by way of the further voice call.

In approaching communication in this manner, the first communications device and the second communications device are only charged for the call at the localised rate of the respective telecommunication carriers 18*a*, 18*b* for their mobile phone networks 16 and not at the higher inter-network rates.

In accordance with a second embodiment of the invention, where like numerals reference like parts, there is a system 100 for communicating with a single mobile communications device having Multiple MS-ISDN identifiers. The system 100 includes the same hardware components as described for the system 10 of the first embodiment. The only difference is the addition of a plurality of shortcode communication lines 102. Each shortcode communication line 102 is associated with a mobile phone network 16. Distribution of the shortcode communication lines 102 is such that there is a single shortcode communication line 102 for each mobile phone network 16.

The system 100 will now be described in the context of the following example.

The first communications device 12 has a MS-ISDN identifier issued to it by the telecommunications carrier 18*a* of a first mobile phone network 16*a*. The first communications device 12 is further operable to communicate by voice and messaging systems with other communications devices by way of the first mobile phone network 16*a*.

The second communications device 14 has a MS-ISDN identifier issued to it by the telecommunications carrier 18*a* of the first mobile phone network 16*a* from a pool of re-usable MS-ISDN identifiers made available on a rental basis. The second communications device 14 has a further MS-ISDN identifier issued to it by each of the other mobile phone networks 16. The second communications device 14 is thereby able to communicate by voice and messaging systems with other communications devices by way of at least one of the mobile phone networks 16.

To assist in directing communications to and from the second communications device 14, at the same time as the administration system 20 allocates a MS-ISDN identifier to the second communications device 14, the owner of the second communications device 14 is prompted to enter in details of the MS-ISDN identifiers allocated to it by the other mobile phone networks 16 as well as other commercial information to facilitate the rental of the allocated MS-ISDN identifier. A table is then established by the administration system 20 cross-referencing the allocated MS-ISDN identifier with the entered MS-ISDN identifiers. This table is then stored in an associated database 22.

With the cross-reference table established and stored in the associated database 22, the second communications device 14 is able to communicate with the first communications device 12 as follows.

The second communications device 14 is operated in a manner that indicates that a voice call is seeking to be established between the second communications device 14 and the first communications device 12. The method for initiating a voice call differs from communications device to communications device and will not be described in more detail here. However, to show that the voice call is intended for the first communications device 12, the allocated MS-ISDN identifier for the first communications device 12 is appended to the shortcode identifier of the shortcode communication line 102 allocated to the mobile phone network 16 (hereafter the "initiating network" 16*b*) through which the second communications device 14 is presently able to communicate. This combination of identifiers (shortcode and MS-ISDN) is then entered as the destination address for the voice call.

As the voice call is routed through the initiating network 16*b*, the administration system 20 presumes the voice call as being one from a communications device having an MS-ISDN identifier included in the pool of MS-ISDN identifiers allocated for use by the system 10. This presumption is based on the fact that the shortcode communication line 102 associated with the administration system 20 has been used to establish the initial voice call.

Operating on this presumption, the administration system 20 checks the MS-ISDN of the second communications device against the associated MS-ISDN identifiers stored in all of the tables in the associated database 22. On identifying matching MS-ISDN identifiers, the administration system 20 cross-references back to the allocated MS-ISDN identifier provided for the first mobile phone network 16*a*. This MS-ISDN identifier is then stored as the initiating address for the voice call.

The administration system 20 thereafter operates in a manner that a further voice call is sought to be established between the communication line allocated to the stored MS-ISDN identifier on the first mobile phone network 16*a*. If this further voice call is able to be established, the administration system 20 acts to connect the voice calls in the following manner.

The voice call between the second communications device 14 and the administration system 20b is linked to the voice call between the administration system 20a and the first communications device 12 by way of a VoIP call as described in the first embodiment. However, as the administration system 20 is connecting the end voice call to the first communications device 12 by way of the stored MS-ISDN identifier, the first communications device 12 is unaware that the call is actually from the administration system 20. Caller ID or any other sort of MS-ISDN identifier system would recognise the call as coming from the stored MS-ISDN identifier associated with the second communications device 14. Further, in this situation, the owner of the second communications device 14 pays for both calls at the localised rates of the respective telecommunication carriers 18a, 18b for their mobile phone networks 16a, 16b.

In accordance with a third embodiment of the invention, where like numerals reference like parts, there is a system (not shown) for communicating with a single mobile communications device having multiple MS-ISDN identifiers. The system has identical components to the system 10 described in the first embodiment, but the operation of the administration system 20 in routing the call differs as follows:

Upon identifying the voice call as being one intended for a communications device having an MS-ISDN identifier included in the pool of MS-ISDN identifiers allocated for use by the system 100, the administration system 20 operates to determine the least costly route for establishing communication. This involves considering such parameters as:

The number of MS-ISDN identifiers associated with the second communications device 14;

The present location of the second communications device 14 as based on the HLR of each MS-ISDN associated with the second communications device 14; and The mobile phone network 16 associated with each MS-ISDN associated with the second communications device 14.

The MS-ISDN associated with the second communications device 14 having the least cost call route is then stored as the destination address for the voice call. The mobile phone network 16 associated which allocated the stored MS-ISDN is hereafter referred to as the "destination network" 16b.

The administration system 20 thereafter operates in a manner that a further voice call is sought to be established between a communication line operable on the destination network 16b associated with the administration system 20 and the stored MS-ISDN identifier for the second communications device 14 for the destination network 16b.

If this further voice call is able to be established, the administration system 20 acts to terminate the voice call, for charging purposes, within the first mobile phone network 16a. Again, this termination does not affect either voice call.

Subsequent conversation between the first communications device 12 and the second communications device 14 is then achieved by way of the voice call to the administration system 20 where it is converted to a VoIP call to the associated communication line operable on the destination network 16b. Final routing of the voice call is achieved by converting the voice call back to its original form for communication by way of the further voice call.

It should be appreciated by the person skilled in the art that the above invention is not limited to the embodiment described. In particular, the following modifications and improvements may be made without departing from the scope of the present invention:

It should be appreciated that due to the nature of the system described in the first and second embodiments of the invention it is possible for the person skilled in the art to modify the system to also allow for communication by way of messaging systems. Such communications would require the administration system 20 to be in communication with the Short Message Service Centres ("SMSCs") of both the mobile phone network 16a and the mobile phone network 16b. However, the general processing of such messages follows the same methodology as that described above in respect of voice calls.

While the above embodiments describe a system whereby initiation of the connecting call is established merely by calling the other parties MS-ISDN identifier (or a shortcode and the other parties MS-ISDN identifier), the connecting call may be established through other mechanisms such as: e-mail; interactive voice recording system; unstructured supplementary service data, amongst others.

The first communications device 12 may be a fixed line phone, VoIP phone, internet phone, satellite phone or ship-to-shore phone. Similarly, the second communications device 14 may be any of the preceding phone types provided that it is mobile.

The MS-ISDN identifier may be a numeric identifier or an alphanumeric identifier.

Before establishing a call with the second communications device 14, the person in possession of the second communications device 14 may be asked to confirm that they are willing to take the call. In this respect, optionally, the person in possession of the second communications device 14 may be notified of such information relevant to making the decision whether to take the call or not as: the identity or caller line identification ("CLI") value of the first communications device 12 and/or the applicable charges that will be levied against the second communications device 14 if the call is taken.

Communication between telecommunication networks 16 may be facilitated through a central communication facilitator rather than through individual administration systems 20.

Furthermore, the features described in the above embodiments and the additional features mentioned above may be combined to form yet additional embodiments that fall within the scope of the present invention.

We claim:

1. A communication system comprising:
a first communications device operable by way of a first mobile phone network;
a second communications device operable by way of the first mobile phone network and at least one additional mobile phone network, the first mobile phone network and each additional mobile phone network issuing a unique MS-ISDN to the second communications device to enable such operation; and
a communications facilitator associated with the first mobile phone network;
where, when a communication from the first communications device to the second communications device is received by the communications facilitator, the communications facilitator determines the present location of the second communications device by interrogating a home location register associated with each of the MS-ISDNs allocated to the second communications device to identify a communication link and relays the communication to the second communications device by way of the at least one additional mobile phone network that allocated the MS-ISDN identified as the communication link.

2. A communication system according to claim 1, where the second communications device is a mobile communications device.

3. A communication system according to claim 1, where the communication is a text message.

4. A communication system according to claim 1, where the unique MS-ISDN issued by the first mobile phone network to the second communications device is taken from a designated pool of unique MS-ISDNs.

5. A communication system according to claim 1, where the identification of the communication link further comprises the consideration of the carrier of each MS-ISDN.

6. A communication system according to claim 1, where a confirmation communication is made to the second communications device seeking confirmation that a communication from the first communications device can be relayed to the second communications device, before so relaying the communication.

7. A communication system according to claim 1, where the communication facilitator receives the communication from the first communications device by way of a shortcode; wherein the at least one characteristic is appended to the shortcode.

8. A communication system according to claim 1, wherein the communications facilitator manages entries of each of the at least one characteristic and the entries are stored in an associated database within the communications facilitator.

9. A method of communicating between a first communications device operable by way of a first mobile phone network and a second communications device operable by way of the first mobile phone network and at least one additional mobile phone network, the first mobile phone network and each additional mobile phone network issuing a unique MS-ISDN to the second communications device to enable such operation, the method comprising the steps of:
receiving a communication from the first communications device;
determining the present location of the second communications device by interrogating a home location register associated with the each of the MS-ISDNs allocated to the second communications device to identify a communication link; and
relaying the communication to the second communications device by way of the at least one additional mobile phone network that allocated the MS-ISDN identified as the communication link.

10. A communications facilitator for facilitating communication between a first communications device operable by way of a first mobile phone network and a second communications device operable by way of the first mobile phone network and at least one additional mobile phone network, the first mobile phone telecommunications network and each additional mobile phone network issuing a unique MS-ISDN to the second communications device, to enable such operation, the communications facilitator also associated with the first mobile phone network and operable, on receipt of a communication from the first communications device to determine the present location of the second communications device by interrogating a home location register associated with each of the MS-ISDNs allocated to the second communications device to identify a communication link and relay the communication to the second communications device by way of the at least one additional mobile phone network that allocated MS-ISDN set as the communication link.

11. A second communications device operable by way of a first mobile phone network and at least one additional mobile phone network, the first mobile phone network and each additional mobile phone network issuing a unique MS-ISDN to the second communications device to enable such operation, the second communications device receives a communication from a communication facilitator, the communication initiated by a first communication device operable by way of the first mobile phone network, by way of a MS-ISDN determined based on a determination by the communication facilitator of the present location of the second communications device by interrogating a home location register associated with each of the MS-ISDNs allocated to the second communications device.

12. A communication system according to claim 1, wherein an identification system on the second communications device identifies the communication as originating from the first communications device even though the communication is relayed from the communications facilitator.

13. A method according to claim 9, wherein an identification system on the second communications device identifies the communication as originating from the first communications device even though the communication is relayed from a communications facilitator.

14. A communications facilitator according to claim 10, wherein an identification system on the second communications device identifies the communication as originating from the first communications device even though the communication is relayed from the communications facilitator.

15. A second communications device according to claim 11, wherein an identification system on the second communication device identifies the communication as originating from the first communications device even though the communication is relayed from the communications facilitator.

16. A communication system according to claim 5, wherein the communications facilitator is operable to determine a least costly route for establishing communications between the first communications device and the second communications device.

17. A method according to claim 9, wherein the identification of the communication link further comprises the consideration of a carrier of each MS-ISDN.

18. A method according to claim 17, wherein the communications facilitator further determines a least costly route for establishing communications between the first communications device and the second communications device.

19. A method according to claim 18, wherein the communications facilitator considers parameters comprising the number of MS-ISDNs allocated to the second communications device, the present location of the second communications device based on the home location register of each MS-ISDN allocated to the second communications device; the mobile phone network associated with each MS-ISDN allocated to the second communications device.

20. A communications facilitator according to claim 10, wherein the identification of the communication link further comprises the consideration of a carrier of each MS-ISDN.

21. A communications facilitator according to claim 20, wherein the communications facilitator further determines a least costly route for establishing communications between the first communications device and the second communications device.

22. A communications facilitator according to claim 21, wherein the communications facilitator considers parameters comprising the number of MS-ISDNs allocated to the second communications device, the present location of the second communications device based on the home location register of each MS-ISDN allocated to the second communications device; the mobile phone network associated with each MS-ISDN allocated to the second communications device.

23. A second communications device according to claim 11, wherein the communication initiated by the first communication device further comprises the consideration of a carrier of each MS-ISDN.

24. A second communications device according to claim 23, wherein the communications facilitator further determines a least costly route for establishing communications between the first communications device and the second communications device.

25. A second communications device according to claim 24, wherein the communications facilitator considers parameters comprising the number of MS-ISDNs allocated to the second communications device, the present location of the second communications device based on the home location register of each MS-ISDN allocated to the second communications device; the mobile phone network associated with each MS-ISDN allocated to the second communications device.

26. A communication system according to claim 1, wherein the communications facilitator is further operable to receive a communication from the second communications device operating on a second mobile phone network to the first communications device by way of an identifier, wherein the identifier comprises of a shortcode and a unique MS-ISDN of the first communications device; and where, when the communication from the second communications device to the first communications device is received, the communications facilitator checks the second MS-ISDN against the database to determine the first MS-ISDN of the second communications device such that the first communications device recognizes that the communication is initiated by the first MS-ISDN of the second communications device.

27. A communication system comprising:
a first communications device operable by way of a first mobile phone network;
a second communications device operable by way of the first mobile phone network and a second mobile phone network, the first mobile phone network and second mobile phone network issuing a first and second MS-ISDN to the second communications device respectively,
wherein the first and second MS-ISDN of the second communications device are stored in a database; and
a communications facilitator associated with the first mobile phone network,
where, when a communication from the second communications in the second mobile phone network device to the first communications device is received by way of an identifier,
wherein the identifier comprises a shortcode and a unique MS-ISDN of the first communications device, and
the communications facilitator checks the second MS-ISDN against the database to determine the first MS-ISDN of the second communications device such that the first communications device recognizes that the communication is initiated by the first MS-ISDN of the second communications device.

* * * * *